United States Patent
Abushwashi

(10) Patent No.: US 10,769,118 B1
(45) Date of Patent: Sep. 8, 2020

(54) SYSTEMS AND METHODS FOR STORING DATA IN MULTIPLE STAGES

(71) Applicant: Veritas Technologies LLC, Santa Clara, CA (US)

(72) Inventor: Aeham Abushwashi, Berkshire (GB)

(73) Assignee: Veritas Technologies LLC, Santa Clara, CA (US)

( * ) Notice: Subject to any disclaimer, the term of this patent is extended or adjusted under 35 U.S.C. 154(b) by 864 days.

(21) Appl. No.: 14/138,125

(22) Filed: Dec. 23, 2013

(51) Int. Cl.
*G06F 16/21* (2019.01)

(52) U.S. Cl.
CPC .................. *G06F 16/21* (2019.01)

(58) Field of Classification Search
CPC .................................... G06F 16/21
USPC ........................................ 707/689
See application file for complete search history.

(56) References Cited

U.S. PATENT DOCUMENTS

| | | | | |
|---|---|---|---|---|
| 8,527,468 | B1* | 9/2013 | Crafford | G06F 17/30011 707/662 |
| 2003/0212649 | A1* | 11/2003 | Denesuk | G06F 17/30864 |
| 2007/0005564 | A1* | 1/2007 | Zehner | G06F 17/30592 |
| 2008/0033905 | A1* | 2/2008 | Stokes | G06Q 10/06 |
| 2008/0104190 | A1* | 5/2008 | Morreale | H04L 12/58 709/206 |
| 2008/0133295 | A1* | 6/2008 | Cappel | G06Q 10/00 705/36 T |
| 2008/0140820 | A1* | 6/2008 | Snyder | H04L 67/02 709/223 |
| 2008/0154928 | A1* | 6/2008 | Bashyam | H03M 7/30 |
| 2009/0254572 | A1* | 10/2009 | Redlich | G06Q 10/06 |
| 2009/0313299 | A1* | 12/2009 | Bonev | G06Q 10/109 |
| 2011/0010358 | A1* | 1/2011 | Zane | G06F 17/30421 707/714 |
| 2013/0086216 | A1* | 4/2013 | Eppinger | G06Q 30/0271 709/217 |
| 2013/0275391 | A1* | 10/2013 | Batwara | G06F 17/30085 707/689 |
| 2014/0081663 | A1* | 3/2014 | Calandro, II | G06F 19/322 705/3 |

OTHER PUBLICATIONS

Lovelace et al.,IBM Enterprise Content Management and System Storage Solutions: Working Together, International Technical Support Organization, First Edition, Sep. 2008, International Business Machines Corporation.*
"MIME", http://en.wikipedia.org/wiki/MIME, as accessed Nov. 13, 2013, Wikipedia, (Feb. 17, 2004).
"Setting Retention Policy for Electronic Information", http://www.ironmountain.com/Knowledge-Center/Reference-Library/View-by-Document-Type/White-Papers-Briefs/S/Setting-Retention-Policy-for-Electronic-Information.aspx, as accessed Nov. 13, 2013, Iron Mountain, White Paper, (2011).

* cited by examiner

*Primary Examiner* — Alford W Kindred
*Assistant Examiner* — Lin Lin M Htay
(74) *Attorney, Agent, or Firm* — FisherBroyles, LLP

(57) ABSTRACT

A computer-implemented method for storing data in multiple stages may include (1) establishing an initial storage period for regulatory compliance and a subsequent storage period for business reference, (2) storing data during the initial storage period for regulatory compliance, (3) upon expiration of the initial storage period, stripping rich content from the data while preserving text content in the data, and (4) storing the stripped data during the subsequent storage period for business reference. Various other methods, systems, and computer-readable media are also disclosed.

20 Claims, 7 Drawing Sheets

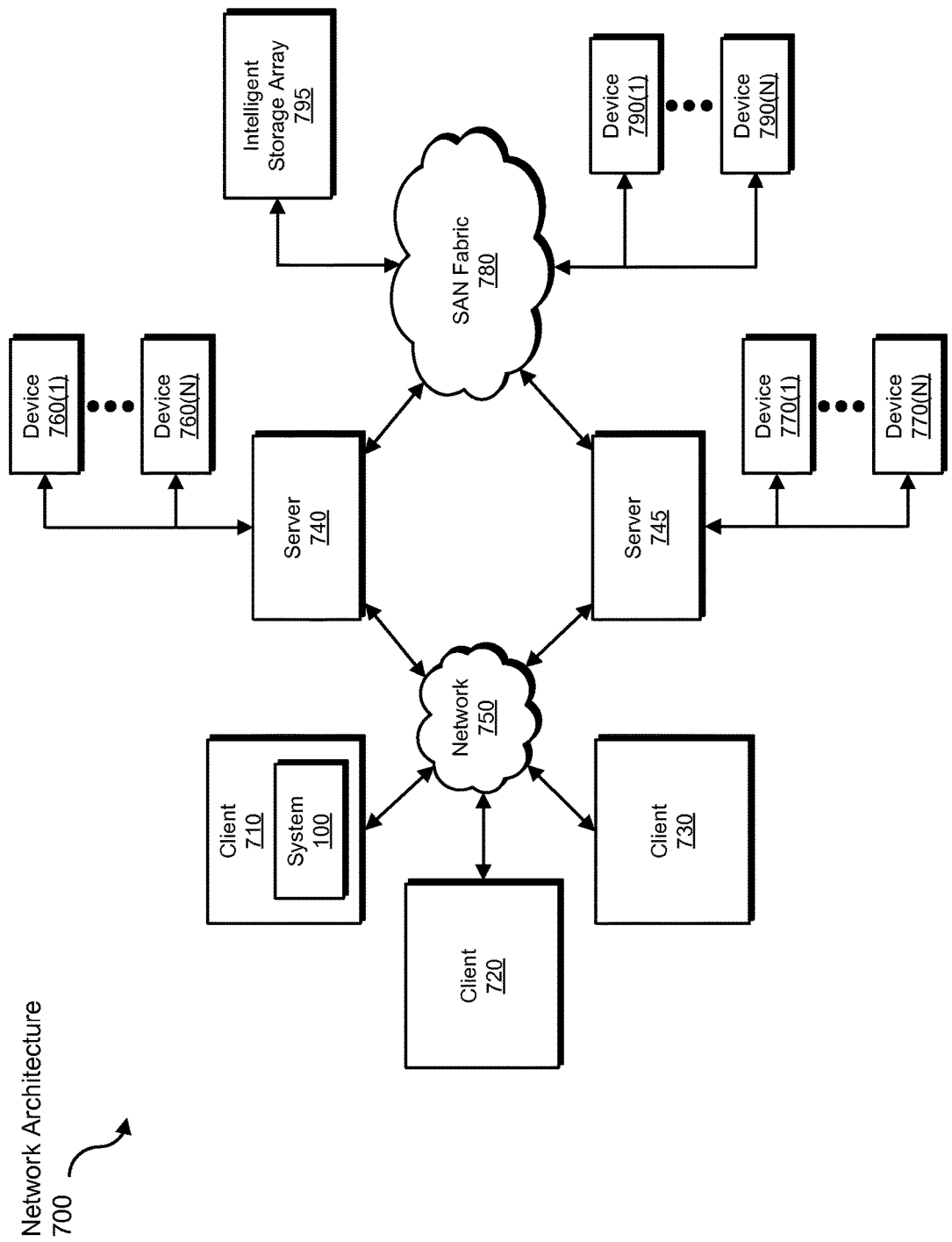

SYSTEMS AND METHODS FOR STORING DATA IN MULTIPLE STAGES

BACKGROUND

Individuals and organizations often need to meet the requirements of various regulations and other authorities. For example, federal regulations may specify how and when organizations should store health, education, business, tax, and/or financial records. These regulations may place strict limits on when these organizations may delete, destroy, lose, or tamper with their records. In particular, regulations may require organizations to store records in original and unaltered form for a specified period of time. Moreover, in an abundance of caution, organizations may voluntarily store these records in unaltered form for longer periods of time than the regulations require. Meanwhile, the requirement to store large volumes of records in unaltered or other form places a heavy burden on the organizations in terms of cost, storage, and maintenance.

Moreover, individuals and organizations also often preserve the same or different records for business purposes. These business records need not necessarily comply with regulatory requirements, and the time periods for the requirements may have already expired. Nevertheless, in an abundance of caution, organizations may preserve records for business purposes, in an unaltered format that still satisfies the regulatory requirements. In other words, the organizations may needlessly, or inefficiently, store records for longer than required by regulations and business needs, or in formats that occupy more storage space than required. More generally, the organizations may fail to distinguish between storage for regulatory purposes and for business purposes, and thereby fail to tailor their storage systems to accommodate both individually. The instant disclosure identifies a need, therefore, for improved methods for storing data in multiple stages.

SUMMARY

As will be described in greater detail below, the instant disclosure generally relates to systems and methods for storing data in multiple stages by storing data (e.g., in sequence) for two or more storage periods. These systems and methods may also alter or strip the data between storage periods to conserve space or accommodate different storage and/or regulatory requirements.

In one example, a computer-implemented method for storing data in multiple stages may include (1) establishing an initial storage period for regulatory compliance and a subsequent storage period for business reference, (2) storing data during the initial storage period for regulatory compliance, (3) upon expiration of the initial storage period, stripping rich content from the data while preserving text content in the data, and (4) storing the stripped data during the subsequent storage period for business reference.

In some examples, the data may be formatted in multipurpose internet mail extensions format. Moreover, the data formatted in multipurpose internet mail extensions format may include multiple layers.

In some embodiments, stripping rich content from the data may include removing one of the multiple layers from the data formatted in multipurpose internet mail extensions format. Moreover, stripping rich content from the data may include removing all but one of the multiple layers from the data formatted in multipurpose internet mail extensions format.

In further examples, the initial storage period for regulatory compliance may be at least partially defined by government regulations. Moreover, the initial storage period for regulatory compliance may expire at a point defined by government regulations.

In some examples, stripping rich content from the data while preserving text content in the data may include preserving substantially all human-readable text in the data. Moreover, stripping rich content from the data while preserving text content in the data may include creating a pure text document.

In further embodiments, stripping rich content from the data while preserving text content in the data may include removing images from the data. Moreover, stripping rich content from the data while preserving text content in the data may include removing all images from the data.

In one embodiment, a system for implementing the above-described method may include (1) an establishment module, stored in memory, that establishes an initial storage period for regulatory compliance and a subsequent storage period for business reference, (2) a regulatory storage module, stored in memory, that stores data during the initial storage period for regulatory compliance, (3) a stripping module, stored in memory, that, upon expiration of the initial storage period, strips rich content from the data while preserving text content in the data, (4) a business storage module, stored in memory, that stores the stripped data during the subsequent storage period for business reference, and (5) at least one physical processor that executes the establishment module, the regulatory storage module, the stripping module, and the business storage module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) establish an initial storage period for regulatory compliance and a subsequent storage period for business reference, (2) store data during the initial storage period for regulatory compliance, (3) upon expiration of the initial storage period, strip rich content from the data while preserving text content in the data, and (4) store the stripped data during the subsequent storage period for business reference.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is a block diagram of an exemplary computing network capable of implementing one or more of the embodiments described and/or illustrated herein.

Figure 1:
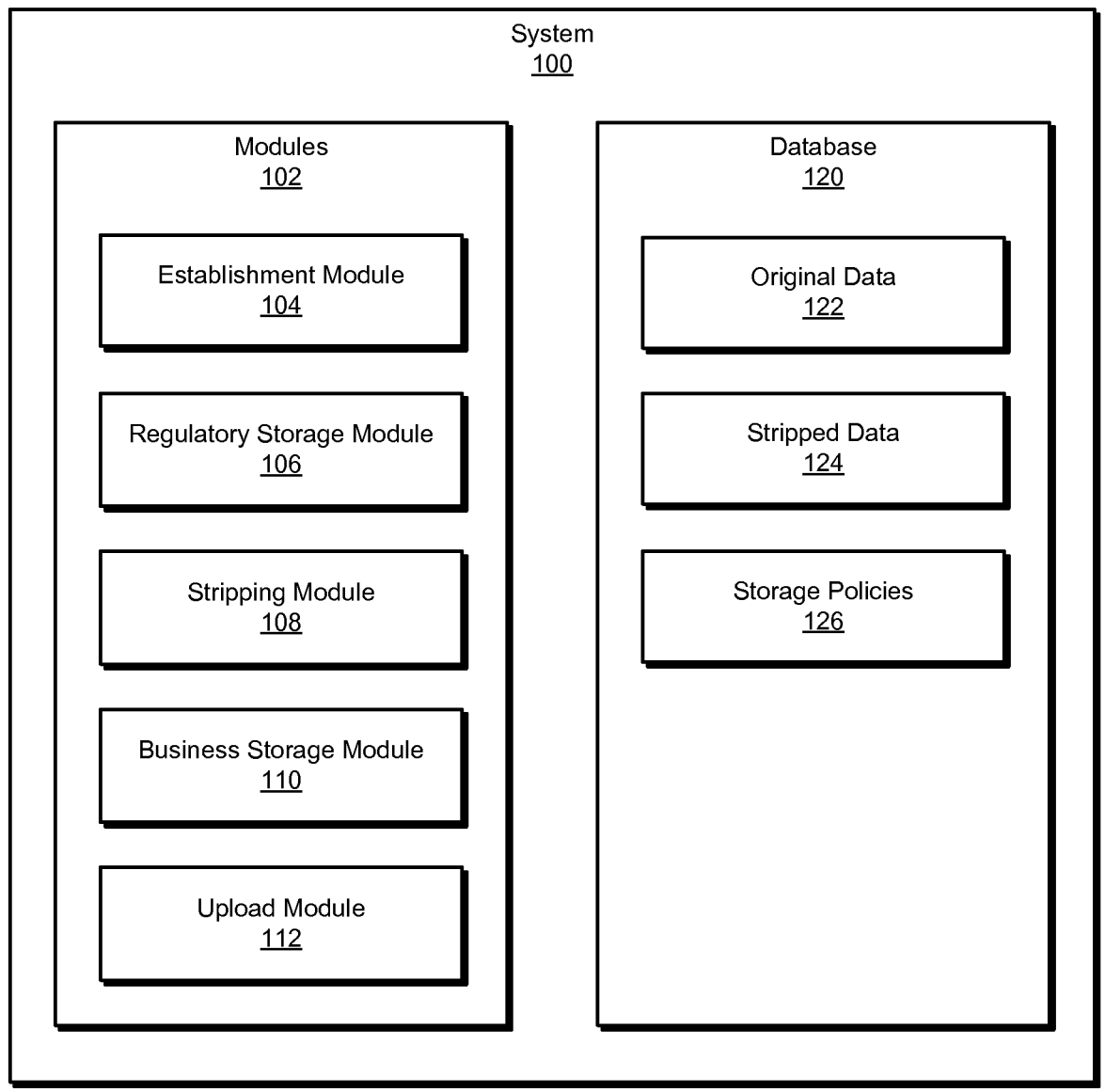
FIG. 1 is a block diagram of an exemplary system for storing data in multiple stages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for storing data in multiple stages. As will be explained in greater detail below, the disclosed methods may reduce the cost and storage requirements of storing legacy and archive data within a storage data repository. In particular, the disclosed methods may preserve data and content that is more helpful for business purposes while deleting other data that may be no longer helpful for regulatory requirements. Accordingly, the disclosed methods and systems may satisfy regulatory requirements while also reducing storage costs.

Figure 2:
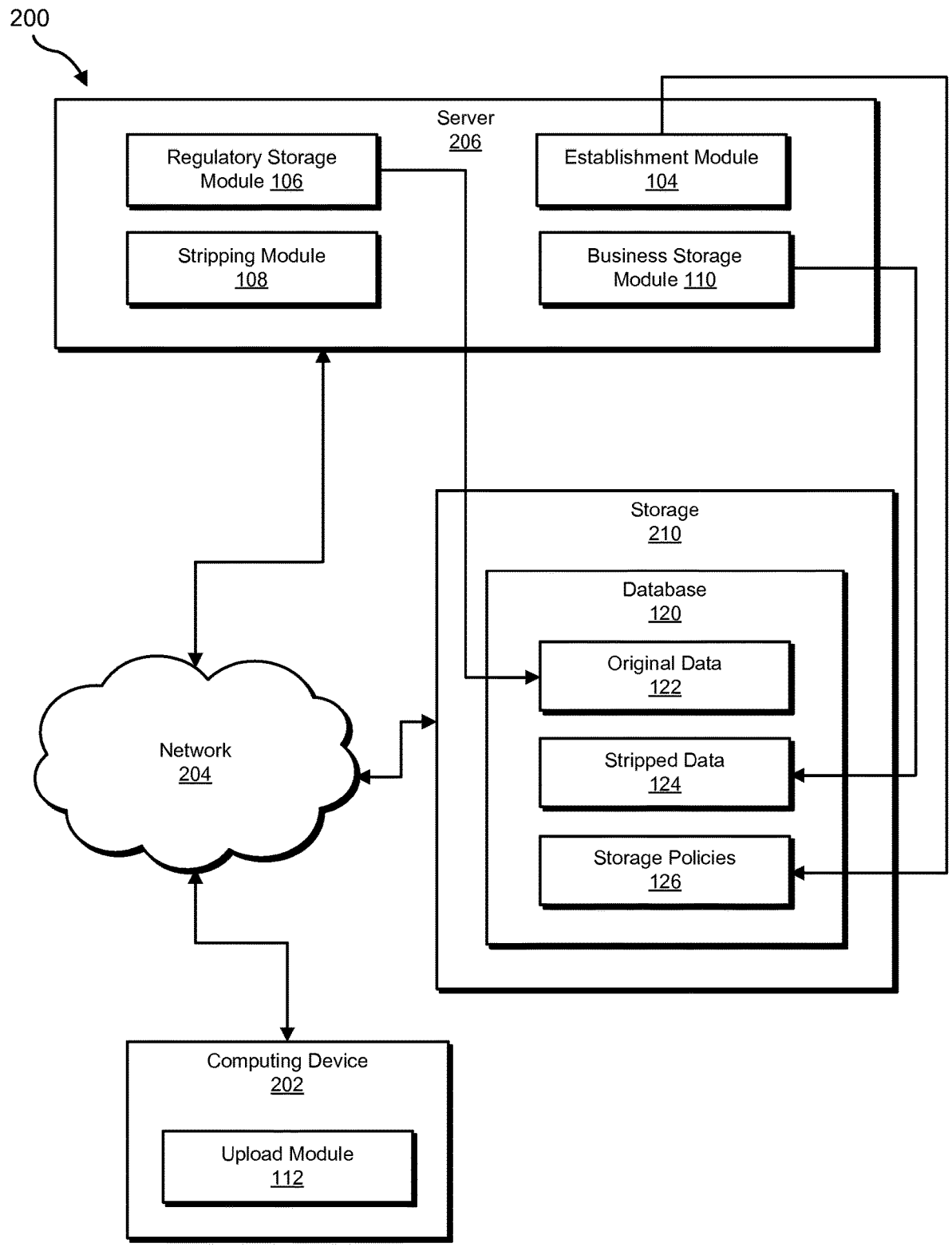
FIG. 2 is a block diagram of an additional exemplary system for storing data in multiple stages.

The following will provide, with reference to FIGS. 1-2, detailed descriptions of exemplary systems for storing data in multiple stages. Detailed descriptions of corresponding computer-implemented methods will also be provided in connection with FIG. 3. Moreover, detailed descriptions of an exemplary timeline for storing data in multiple stages will be provided in connection with FIG. 4. Furthermore, detailed descriptions of exemplary original data and data layers will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for storing data in multiple stages. As illustrated in this figure, exemplary system 100 may include one or more modules 102 for performing one or more tasks. For example, and as will be explained in greater detail below, exemplary system 100 may include an establishment module 104 that establishes an initial storage period for regulatory compliance and a subsequent storage period for business reference. Exemplary system 100 may also include a regulatory storage module 106 that stores data during the initial storage period for regulatory compliance.

In addition, and as will be described in greater detail below, exemplary system 100 may include a stripping module 108 that, upon expiration of the initial storage period, strips rich content from the data while preserving text content in the data. Moreover, exemplary system 100 may further include a business storage module 110 that stores the stripped data during the subsequent storage period for business reference.

Furthermore, exemplary system 100 may include an upload module 112 that may upload data and records for storage to an external server or storage repository, as discussed below. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store original data 122. As used herein, the phrase "original data" generally refers to any data stored for regulatory and/or business purposes prior to a step of stripping the data, as discussed below. In other words, "original data" generally refers to data as originally received and/or stored for regulatory or other purposes, prior to modification in one or all stripping or compression steps (which may occur subsequent to an earlier stripping or compression step). Original data 122 may include one or more records, files, documents, memory contents, and/or any other suitable data for regulatory compliance and business purposes, including metadata and/or databases.

In further examples, database 120 may also be configured to include stripped data 124. As used herein, the phrase "stripped data" generally refers to original or other data during and/or after a stripping step, which may compress the size of original data 122 and/or remove one or more components, parts, segments, and/or items of functionality (or replace with a smaller version), as discussed below. Moreover, database 120 may also be configured to include storage policies 126. As used herein, the phrase "storage policies" generally refers to any policy, rule, guideline, schedule, and/or data structure that establishes and/or defines (strictly or loosely, completely or in part) an order, sequence, and/or manner of storing data, including storing data in multiple stages in different formats.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120.

Additionally or alternatively, server 206 may be programmed with one or more of modules 102 and/or may store all or a portion of the data in database 120.

In the example of FIG. 2, server 206 may manage, execute, and/or direct the storage of data, such as original data 122, in multiple stages. Server 206 may, therefore, contain and/or communicate with one or more storages, such as storage 210, which may include part or all of database 120. Because server 206 is directed to storing, archiving, and/or processing original data 122, server 206 may receive original data 122 from one or more computing devices, such as computing device 202 (which may represent a client) through network 204 or otherwise (e.g., by mail or hand carry of storage mediums). Accordingly, computing device 202 may upload original data 122 to server 206 and/or storage 210 using upload module 112. Moreover, in some examples, one or more of server 206, computing device 202, database 120, and/or members of modules 102 may be combined or grouped into different permutations of different or the same (e.g., single) device(s).

In one embodiment, one or more of modules 102 from FIG. 1 may, when executed by at least one processor of computing device 202 and/or server 206, enable computing device 202 and/or server 206 to store data in multiple stages. For example, and as will be described in greater detail below, one or more of modules 102 may cause computing device 202 and/or server 206 to establish an initial storage period for regulatory compliance and a subsequent storage period for business reference, such as by specifying one or more storage policies 126. Moreover, one or more of modules 102 may cause computing device 202 and/or server 206 to store original data 122 during the initial storage period for regulatory compliance. Furthermore, one or more of modules 102 may also cause computing device 202 and/or server 206 to, upon expiration of the initial storage period, strip rich content from original data 122 while preserving text content in original data 122. In some subsequent examples, one or more of modules 102 may also cause computing device 202 and/or server 206 to store stripped data 124 during the subsequent storage period for business reference.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of storing and/or stripping data, such as data for regulatory and/or business purposes. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
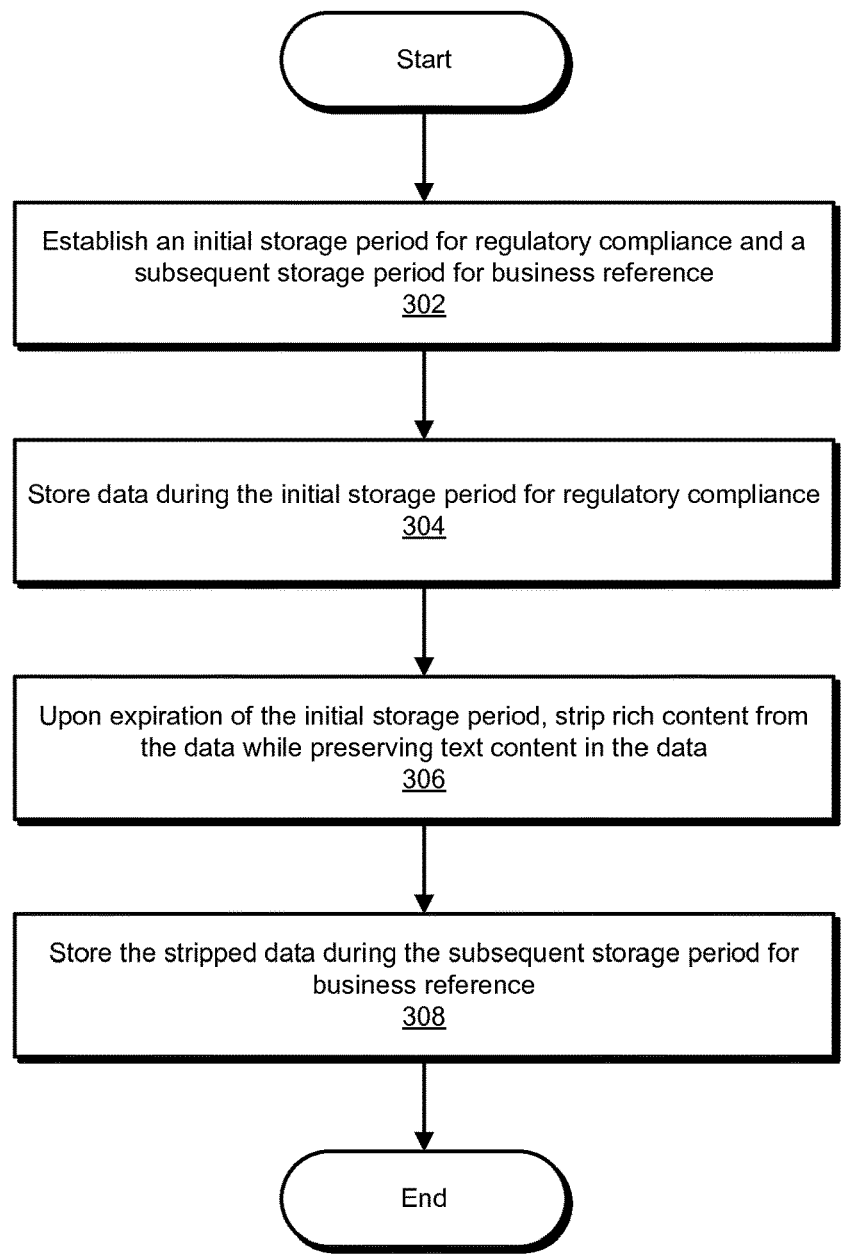
FIG. 3 is a flow diagram of an exemplary method for storing data in multiple stages.

FIG. 3 is a flow diagram of an exemplary computer-implemented method 300 for storing data in multiple stages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may establish an initial storage period for regulatory compliance and a subsequent storage period for business reference. For example, establishment module 104 may, as part of server 206 in FIG. 2, establish an initial storage period for regulatory compliance and a subsequent storage period for business reference, such as by specifying one or more storage policies 126.

As used herein, the phrase "initial storage period for regulatory compliance" generally refers to a period of time (1) established by law or government regulations (e.g., medical, educational, banking, financial, and/or tax regulations), (2) based on such a period, including a period of time defined by an organization in terms (e.g., alphanumeric terms) through computer file names, directories, settings, and/or metadata that are the same, or substantially the same, as one or more names for a government regulation or law, (3) substantially overlapping and/or having substantially the same end points as a period of time established by law or government regulations, and/or (4) a period of time defined by an individual, organization, and/or business within a computing system and used to satisfy a law or government regulation. Moreover, as used herein, the phrase "regulatory compliance" generally refers to any civil, criminal, and/or other rule enforced or potentially enforced by government, including federal, state, and local government, federal and state agencies, quasi-government (e.g., created by government) institutions, and/or private contract. In some cases, the initial storage period for regulatory compliance may end prior to deletion or discarding of original data 122 and/or prior to the formal end of the corresponding regulatory period as defined by law or government.

In some specific examples, the initial storage period for regulatory compliance is at least partially defined by government regulations. Moreover, the initial storage period for regulatory compliance may expire at a point defined by government regulations.

Similarly, as used herein, the phrase "subsequent storage period for business reference" generally refers to any period of time that begins at the point of stripping original data, as discussed below, or at a time based on that point, and during which data is stored for reference and/or retrieval by a business or organization without necessarily satisfying any regulatory requirement. Notably, the systems and methods herein may, in some embodiments, continue to save original data 122 while also creating and/or storing stripped data 124, without immediately discarding and/or deleting original data 122 (e.g., with some delay, or indefinitely without ever deleting original data 122).

Figure 4:
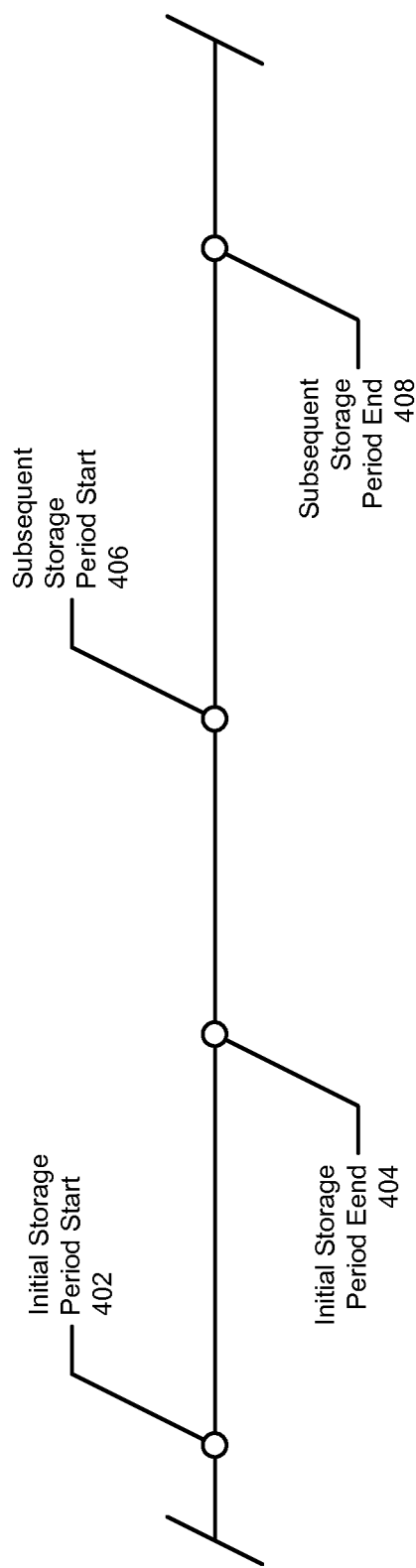
FIG. 4 is a block diagram that shows an exemplary timeline for storing data in multiple stages.

FIG. 4 shows a block diagram indicating a timeline for storing data in multiple stages. As shown in FIG. 4, the initial storage period may begin at initial storage period start 402. Similarly, the initial storage period may end at initial storage period end 404. Moreover, the subsequent storage period may begin at subsequent storage period start 406. Similarly, the subsequent storage period may end at subsequent storage period end 408, or may not end at all. Establishment module 104 may define each of these points as static, predefined points known to occur at specified times and dates in advance (e.g., in advance of one or both storage periods), and/or contingent upon the dynamic occurrence of one or more later events. As shown in FIG. 4, a gap or delay may occur between initial storage period end 404 and subsequent storage period start 406. The gap may provide a time period for stripping original data 122, as discussed below. Alternatively, initial storage period end 404 and subsequent storage period start 406 may occur on the same, or substantially the same, day and/or time. More specifically, a start and end point for stripping original data 122 may occur at any point on and/or between initial storage period end 404 and subsequent storage period start 406.

Establishment module 104 may establish the initial storage period for regulatory compliance and the subsequent storage period for business reference in a variety of ways. In general, establishment module 104 may autonomously (e.g., using default settings, rules, and/or values) and/or with user input, establish one or more start points, pause points or periods, and/or end points for the initial storage period and/or the subsequent storage period. The start, pause, and/or end points may be static and/or dynamic and changing (e.g., not dependent on future events or dependent on the occurrence and/or outcome of them). In some examples, establishment module 104 may define any of these timing points as the result of functions (e.g., algebraic, and/or other business functions) specified in terms of one or more other points (e.g., an end point may be defined as occurring two years from a start point, whenever the start point may be). In general, the end of the initial storage period may occur upon stripping original data 122, as discussed further below. More generally, upon the occurrence of one or more start points, pause points, end points, and/or condition events, establishment module 104 may input, prompt for, and/or solicit further data, user input, and/or user or administrator approval or override. For example, establishment module 104 may solicit or prompt for a user or program to specify a timing of a start point, pause point or period, end point, or condition event, a type of condition, confirmation of previously-established or default settings, one or more rules to establish when the condition is satisfied, actions to take upon the occurrence of any event or condition, and/or settings for how, when, and/or where to format, strip (e.g., what components, layers, and/or formats to strip), and/or save data upon or during any period and/or point or event.

Condition events may include an attempt to access data (e.g., an attempt to access original data 122 after expiration of the initial storage period may trigger stripping of the data, as discussed below), any event defined by government regulations, user approval, user specification of one or more settings or rules for stripping data, and/or start or expiration of a regulatory period set by law or government regulations. Condition events may also include expiration of a time period labeled (e.g., by a computer file name, directory name, and/or file metadata) in terms of a government regulation and substantially overlapping with a period set by law or government regulation, or based on the same. Establishment module 104 may, with users, defaults settings, and/or software, specify a date, timing, and/or schedule for storing and/or stripping data. Moreover, establishment module 104 may also specify conditions (e.g., any condition mentioned herein) for all data and/or different conditions (e.g., timing, storage, location, and/or stripping conditions) for different types of data (e.g., specify different layers, components, formats, and/or modules to strip from data satisfying one or more identifying functions or conditions, including file type, name, origin, author, source, size, and/or security classification). In addition, establishment module 104 may further establish locations (e.g., geographic locations, private addresses, computing systems, drives, physical and/or virtual machines, disks, files, folders, and/or other locations) for receiving and/or storing data, speeds for transferring, copying, and/or moving data, as well as security settings, encryption settings, and/or compression settings for storing data.

In general, establishment module 104 may establish any of the above settings and/or conditions using a user interface (e.g., graphical user interface), which may appear in advance of all data storage, upon user command, at a time of requesting data (e.g., by establishment module 104), and/or when the data is needed (e.g., upon establishment module 104 or another module determining that data is needed to perform a function, but not yet specified). The user interface may include check boxes, buttons, text input boxes, and/or drop down menus to specify any of the timing, location, type, settings, schedules, and/or other rules and details mentioned above.

As illustrated in FIG. 3, at step 304 one or more of the systems described herein may store data during the initial storage period for regulatory compliance. For example, regulatory storage module 106 may, as part of server 206 in FIG. 2, store original data 122 during the initial storage period for regulatory compliance.

Regulatory storage module 106 may store original data 122 during the initial storage period for regulatory compliance in a variety of ways. In general, regulatory storage module 106 may (e.g., in cooperation with establishment module 104) identify initial storage period start 402. Regulatory storage module 106 may check whether one or more items of information (e.g., needed items of information) are specified, including a timing, location, and/or other settings. If one or more items of information are missing, regulatory storage module 106 may seek their input. Upon identifying each of the items of information, regulatory storage module 106 may apply them by storing data at the specified, predefined, and/or default location and timing, according to any other specified or default settings.

Regulatory storage module 106 may store original data 122 in unaltered format and/or upon stripping, compressing, and/or encrypting original data 122. Thus, although stripping module 108 may later strip original data 122 further for business purposes, stripping module 108 may also initially strip original data 122 in a manner that conserves some storage space while also satisfying one or more regulatory requirements.

In some examples, regulatory storage module 106 may access a database or other data source and there obtain information about regulatory storage requirements, such as timing, alteration/stripping (e.g., do not alter the data), data quality, data formatting, and/or storage location requirements. Regulatory storage module 106 may then store original data 122 in a manner that satisfies the retrieved regulatory storage requirements (e.g., by altering, modifying, and/or specifying settings designated and/or consistent with the retrieved requirements). Users and/or software may update requirements or settings within the database or data source as the law and/or regulations change, while maintaining the same, similar, and/or associated reference to the location where that information is stored for retrieval. For example, regulatory storage module 106 may generally retrieve medical record requirements (e.g., for a particular federal law, as identified by name, acronym, and/or keyword) from the same, substantially same, and/or associated location, and administrators may change the information specified there over time to reflect changes in the law.

As illustrated in FIG. 3, at step 306 one or more of the systems described herein may, upon expiration of the initial storage period, strip rich content from the data while preserving text content in the data. For example, stripping module 108 may, as part of server 206 in FIG. 2, and upon expiration of the initial storage period, strip rich content from original data 122 while preserving text content in original data 122.

As used herein, "rich content" generally refers to any content that formats data or a document for display and/or processing beyond a plain text formatting (e.g., metadata), including formatting for display, such as font, bold, italics, underline, paragraph, indent, inter-word and/or inter-line pixel spacing, coloring, highlighting, and/or embedded or attached multimedia (sound, images, and/or video) or other documents (e.g., any formatting not preserved or maintained by a text or .TXT file). Notably, stripping module 108 may, in some cases, strip some rich content without stripping all rich content from original data 122. Stripping module 108 may similarly preserve text content in original data 122 without preserving all text content.

Stripping module 108 may, upon expiration of the initial storage period, strip rich content from original data 122 while preserving text content in original data 122, in a variety of ways. In some examples, the data may include an email and/or other document. The email and/or other document may be formatted to include multiple layers. Moreover, the various layers may specify different settings for formatting and/or processing one or more shared underlying sets of data (e.g., text data). Alternatively, one or more various layers may specify both underlying content and rules or settings for processing, formatting, and/or displaying that content.

In one example, the data may be formatted in multipurpose internet mail extensions (MIME) format. The data formatted in MIME format may include a multiple layers or sections. In some examples, these layers or sections may be defined in terms of parts using the MIME keyword "mutipart," such as "multipart/mixed", "multipart/digest", "multipart/message", and/or "multipart/alternative."

Figure 5:
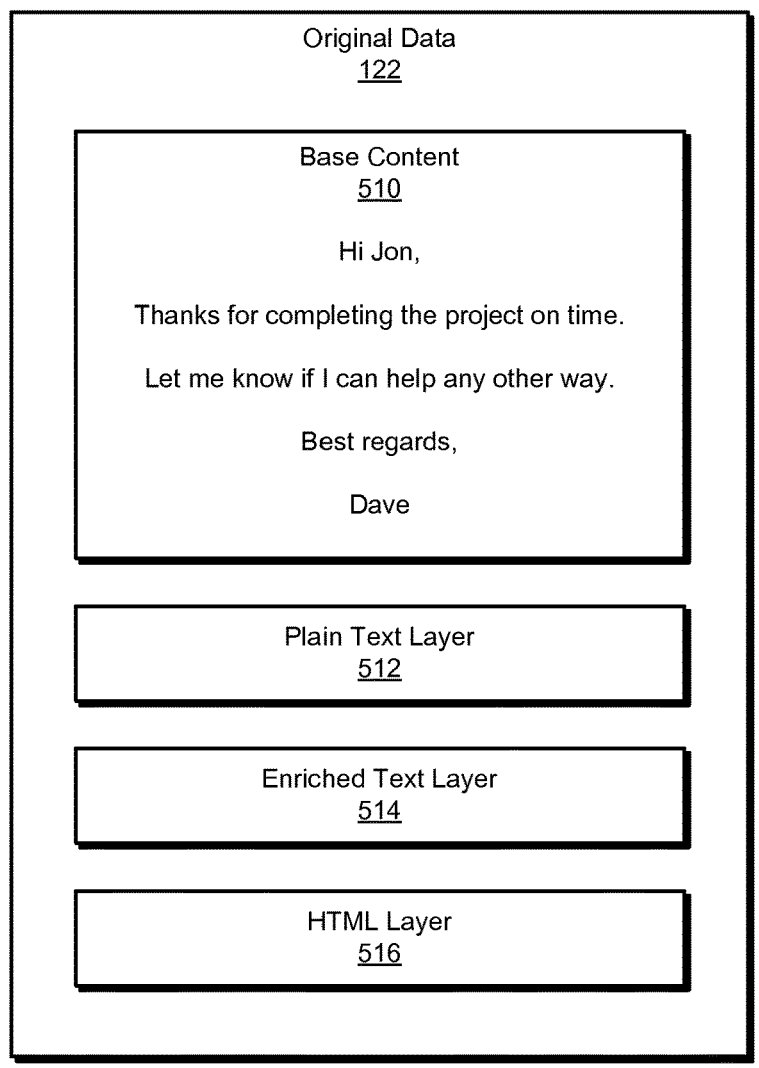
FIG. 5 is a block diagram that shows exemplary data including multiple layers of formatting.

FIG. 5 shows an example of original data 122, which may correspond to a MIME email or other layered file. As shown in FIG. 5, original data 122 may include base content 510, which may include plain text, as well as corresponding layers or sections that specify how base content 510 may be formatted and/or displayed. These layers or sections may include a plain text layer 512, an enriched text layer 514, and/or an HTML layer 516.

Stripping module 108 may strip original data 122 by removing one or more parts of the "multipart" message. In some examples, including the example of a "multipart/alternative" message, the data may include multiple layers of different richness, content, and/or expressiveness. These layers may include "text/plain", "text/enriched", "text/html", and "application/x" for any arbitrary application or protocol "x" that may read underlying text. Moreover, these layers may be ordered (e.g., as specified by MIME specifications) within the data from the least expressive, which may (in some cases) be plain text, to the richest, most preferred, most space consuming, and/or most expressive (e.g, such that the richest is placed last).

Stripping module 108 may strip rich content from the data at least in part by removing one of the multiple layers from the data formatted in MIME format. In general, stripping module 108 may remove any permutation of the layers within a layered message (MIME or otherwise), including removing just the plain text, removing just the most expressive layer, removing one or more intermediary layers, and/or removing two or more layers according to any mathematical permutation as specified in advance or in real time (upon stripping) by a user, administrator, default setting, algorithm, and/or establishment module 104. For example, stripping module 108 may remove the top and/or bottom N layers, where N corresponds to any arbitrary natural number. In some embodiments, stripping module 108 may strip an html and/or rich text layer while preserving a plain text layer. In other words, stripping module 108 may strip rich content from the data while preserving text content in the data at least in part by preserving substantially all human-readable text in the data (i.e., text for display in a message or word document file as part of the message). Moreover, stripping module 108 may strip rich content from the data while preserving text content in the data at least in part by creating a pure text document, such as by creating a new blank text file and writing and/or copying data to the file, and/or modifying another text file to include the plain text from stripped original data 122.

In view of the above, stripping module 108 may remove any permutation of plain text layer 512, enriched text layer 514, and HTML layer 516 (while generally preserving one layer and/or base content 510 to maintain a functional, readable, and/or recoverable document). In some examples, stripping module 108 may also modify base content 510 (or another layer, in some formats) by removing white space and/or line breaks according to a rule, such as removing all line breaks, and/or substituting a sequence of spaces and/or breaks with fewer or just one spaces and/or breaks. Stripping module 108 may also otherwise compress base content 510, including compressing in a manner that preserve human-readability of base content 510.

Moreover, stripping module 108 may similarly remove and/or replace redundant, well-known, and/or unhelpful non-rich (e.g., text) content, including content identified (e.g., by establishment module 104 or stripping module 108, based on user input) as redundant, replaceable, and/or removable. In those cases, stripping module 108 may remove and/or replace non-rich content according to rules established in advance by a user or organization, or according to software defaults. For example, stripping module 108 may remove a company header, footer, signature, and/or business contact information, and/or replace the information with smaller content and/or a symbol representative of the contact (e.g., specified in a mapping for compressing/decompressing content).

Although the example of FIG. 5 focuses on a MIME email or similar document, the same principles and techniques herein may apply to any general file, document, and/or record, such as a word processing document. Stripping module 108 may remove and/or replace with smaller content some or all layers and/or kinds of rich content. For example, stripping module 108 may remove one or more images, or all images, from original data 122. A user, administrator, and/or software (e.g., autonomously) may specify rules for stripping data, including specifying that some or all metadata and/or formatting for display, such as font, bold, italics, underline, paragraph, indent, inter-word and/or inter-line pixel spacing, coloring, highlighting, and/or embedded or attached multimedia (sound, images, and/or video) or other documents (e.g., any formatting not preserved or maintained by a text or .TXT file). Stripping module 108 may remove and/or replace any permutation of the above (e.g., by replacing images or other content with a lossy, compressed, and/or smaller file size or file type version), according to one or more predefined rules, which may be personalized for different groups of file, including particular file sizes, client files, file authors, sources, locations, file types, and/or file directories. In general, stripping module 108 may reference characters, such as backslash, forward slash, brackets (of any type), keywords, and/or delimiters to parse original data 122 into various sections, fields, and/or layers, which may correspond to any of the one or more types or segments of rich content discussed above. Stripping module 108 may use those identifiers to locate, remove, and/or replace rich content.

As illustrated in FIG. 3, at step 308 one or more of the systems described herein may store the stripped data during the subsequent storage period for business reference. For example, business storage module 110 may store stripped data 124 during the subsequent storage period for business reference.

Business storage module 110 may store stripped data 124 during the subsequent storage period for business reference in a variety of ways. In general, business storage module 110 may identify subsequent storage period start 406, which may be based upon a start and/or completion of stripping original data 122. Moreover, business storage module 110 may store stripped data 124 in any manner that parallels how regulatory storage module 106 stored original data 122, except that business storage module 110 may retrieve and/or apply rules and settings that correspond to the subsequent storage period for business reference, instead of the initial storage period for regulatory compliance. Accordingly, business storage module 110 may store stripped data 124 according to any policy established by establishment module 104, which specifies timing, locations, and other storage settings, as discussed above in parallel for steps 302 and 304.

Business storage module 110 may store stripped data 124 until subsequent storage period end 408 and/or past subsequent storage period end 408 (e.g., in a state where the data remains latent but unprotected and vulnerable or free for future deletion or overwriting). Moreover, business storage module 110 may immediately, substantially immediately, and/or after some specified delay delete or discard stripped data 124 and/or original data 122 (e.g., by overwriting, making free, and/or deleting or reassigning pointers). Notably, business storage module 110 or another module may also delete original data 122 on or after at least initial storage period end 404. Moreover, the systems and methods described herein may also repeat any cycle of storing and/or stripping data, by creating three, four, five, or more storage periods, and at the start or end of any period, may strip or further strip data. In some cases, the data may always or substantially always becomes smaller in size and/or contain less rich content than previously, all according to one or more policies established by establishment module 104. For example, the systems and methods may first store unaltered data for one period, then strip the data of attachments, and store for another period, and then strip the data of multimedia functionality, and then store for another period, and finally strip the data to plain text, and then store the plain text for a last period (which may potentially be indefinite).

In some examples, the systems and methods described herein may render the process of stripping original data 122 invisible to an end user such that the user may access stripped data 124 in the same manner as accessing original data 122, with or without the systems providing a notification, icon, prompt, or other indication of the difference (either upon stripping and/or upon accessing the data). For example, business storage module 110 may store stripped data 124 in the same physical, virtual, symbolic, or other location as original data 122, such that when the user accesses the same location, using the same methods, the user retrieves or accesses new stripped data 124 instead of original data 122 (even if original data is still stored elsewhere, at an original physical location or relocated to another location).

Furthermore, the systems and methods described herein may perform method 300 and the stripping of original data 122 in bulk or batch mode, upon the occurrence of a static time or expiration of a static time period (e.g., a batch mode, not dependent on a user requesting data), and/or dynamically upon request to access original data 122 at a time after the expiration of the initial storage period (e.g., an on-demand mode). The systems and methods may also be configured (e.g., according to storage policies 126) to apply the static mode or the dynamic mode based on one or more conditions, including one or more of a bandwidth condition, a storage cost condition, a storage performance condition, a time, date, and/or location condition, and/or a file type or size condition (or any other condition for identifying and distinguishing between files, as discussed above). For example, the systems and methods described herein may use the on-demand mode when a cost of storing original data 122 remains less or equal to a predefined threshold, including a threshold cost of stripping and/or fetching original data 122 (which may be determined by one or more of modules 102, or specified by a user).

As explained above, the disclosed methods may reduce the cost and storage requirements of storing legacy and archive data within a storage data repository. In particular, the disclosed methods may preserve data and content that is more helpful for business purposes while deleting other data that may be no longer helpful for regulatory requirements. Accordingly, the disclosed methods and systems may satisfy regulatory requirements while also reducing storage costs.

Figure 6:
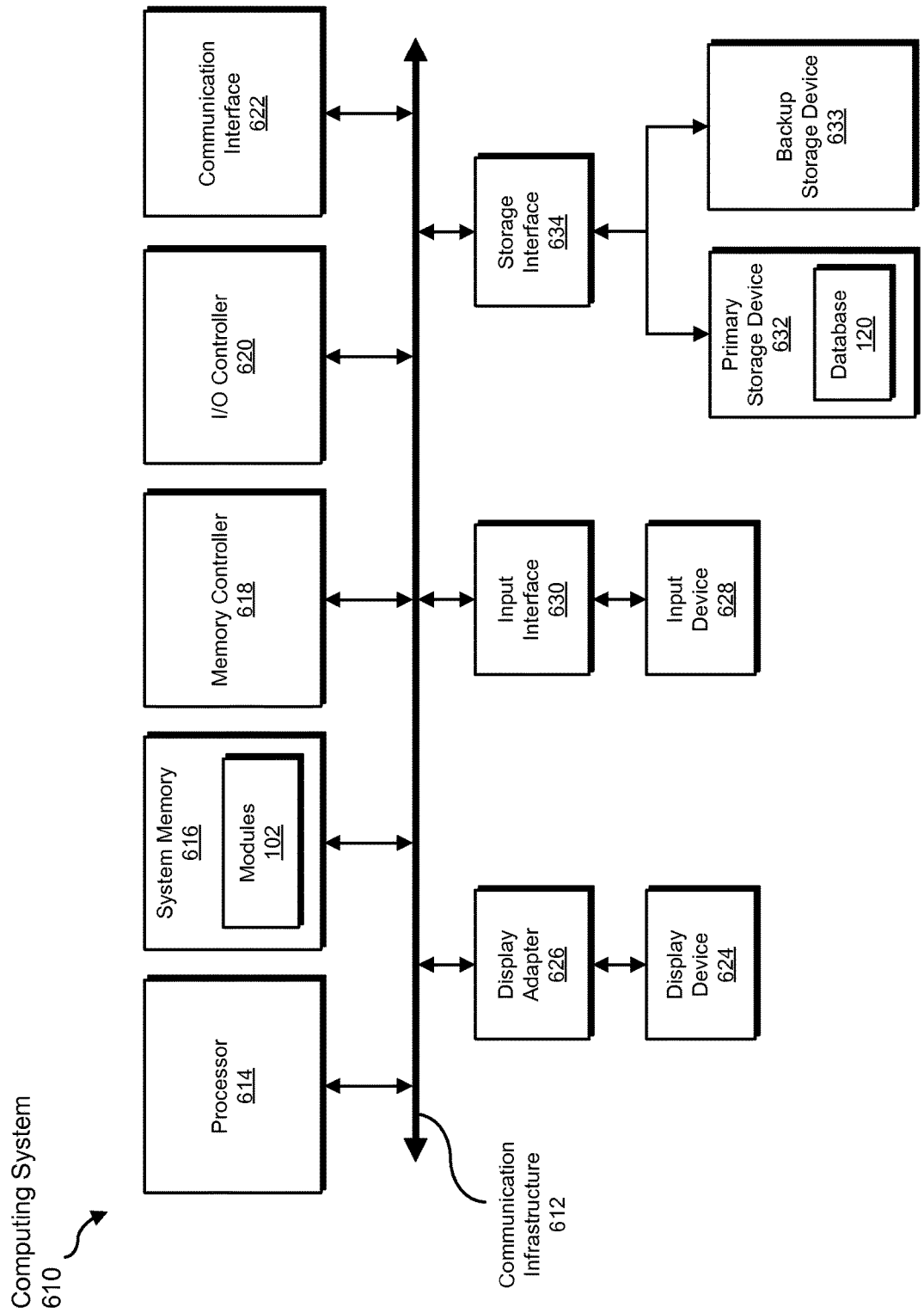
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations.

For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for storing data in multiple stages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data, such as business and evidentiary records, to be transformed, transform the data by stripping the data, output a result of the transformation to a display or storage, use the result of the transformation to preserve records, information, and evidence and/or satisfy regulatory requirements, and store the result of the transformation to a disk or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for storing data in multiple stages, at least a portion of the method being performed by a computing device comprising at least one processor, the method comprising:
    establishing an initial storage period for regulatory compliance and a subsequent storage period for business reference, the initial storage period expiring at a point defined at least in part by government regulations;
    storing an email formatted in the multipurpose internet mail extensions format during the initial storage period for regulatory compliance;
    upon expiration of the initial storage period at the point defined at least in part by government regulations, stripping a hypertext markup language layer from the email formatted in the multipurpose internet mail extensions format while preserving a plain text layer in the email formatted in the multipurpose internet mail extensions format;
    storing the stripped email formatted in the multipurpose internet mail extensions format during the subsequent storage period for business reference in place of a previous version of the email formatted in the multipurpose internet mail extensions format such that storage space for storing the email is reduced.

2. The method of claim 1, wherein the email formatted in the multipurpose internet mail extensions format contains multiple layers.

3. The method of claim 2, wherein the layers are ordered within the email formatted in the multipurpose internet mail extensions format from the least space consuming to the most space consuming.

4. The method of claim 2, wherein the layers are defined using a multipurpose internet mail extensions format multipart keyword.

5. The method of claim 4, wherein the layers are defined using a multipurpose internet mail extensions format multipart-alternative keyword.

6. The method of claim 1, wherein stripping the hypertext markup language layer from the email formatted in the multipurpose internet mail extensions format is performed in a batch mode.

7. The method of claim 1, wherein the email formatted in the multipurpose internet mail extensions format is stored in unaltered format during the initial storage period for regulatory compliance.

8. The method of claim 1, wherein stripping the hypertext markup language layer from the email formatted in the multipurpose internet mail extensions format while preserving the plain text layer in the email formatted in the multipurpose internet mail extensions format comprises preserving all human-readable text in the email formatted in the multipurpose internet mail extensions format.

9. The method of claim 1, wherein stripping the hypertext markup language layer from the email formatted in the multipurpose internet mail extensions format while preserving the plain text layer in the email formatted in the multipurpose internet mail extensions format comprises creating a pure text document.

10. The method of claim 1, wherein stripping the hypertext markup language layer from the email formatted in the multipurpose internet mail extensions format while preserving the plain text layer in the email formatted in the multipurpose internet mail extensions format comprises removing images from the email formatted in the multipurpose internet mail extensions format.

11. The method of claim 10, wherein stripping the hypertext markup language layer from the email formatted in the multipurpose internet mail extensions format while preserving the plain text layer in the email formatted in the multipurpose internet mail extensions format comprises removing all images from the email formatted in the multipurpose internet mail extensions format.

12. A system for storing data in multiple stages, the system comprising:
    an establishment module, stored in memory, that establishes an initial storage period for regulatory compliance and a subsequent storage period for business reference, the initial storage period expiring at a point defined at least in part by government regulations;
    a regulatory storage module, stored in memory, that stores an email formatted in the multipurpose internet mail extensions format during the initial storage period for regulatory compliance;
    a stripping module, stored in memory, that, upon expiration of the initial storage period at the point defined at least in part by government regulations, strips a hypertext markup language layer from the email formatted in the multipurpose internet mail extensions format while preserving a plain text layer in the email formatted in the multipurpose internet mail extensions format;
    a business storage module, stored in memory, that stores the stripped email formatted in the multipurpose internet mail extensions format during the subsequent storage period for business reference in place of a previous version of the email formatted in the multipurpose internet mail extensions format such that storage space for storing the email is reduced;
    at least one physical processor that executes the establishment module, the regulatory storage module, the stripping module, and the business storage module.

13. The system of claim 12, wherein the email formatted in the multipurpose internet mail extensions format contains multiple layers.

14. The system of claim 13, wherein the layers are ordered within the email formatted in the multipurpose internet mail extensions format from the least space consuming to the most space consuming.

15. The system of claim 13, wherein the layers are defined using a multipurpose internet mail extensions format multipart keyword.

16. The system of claim 15, wherein the layers are defined using a multipurpose internet mail extensions format multipart-alternative keyword.

17. The system of claim 12, wherein the stripping module strips the hypertext markup language layer from the email formatted in the multipurpose internet mail extensions format as part of a batch mode.

18. The system of claim 12, wherein the regulatory storage module stores the email formatted in the multipurpose internet mail extensions format in unaltered format during the initial storage period for regulatory compliance.

19. The system of claim 12, wherein the stripping module strips the hypertext markup language layer from the email formatted in the multipurpose internet mail extensions format while preserving the plain text layer in the email formatted in the multipurpose internet mail extensions format at least in part by preserving all human-readable text in the email formatted in the multipurpose internet mail extensions format.

20. A non-transitory computer-readable medium comprising one or more computer-executable instructions that, when executed by at least one processor of a computing device, cause the computing device to:

establish an initial storage period for regulatory compliance and a subsequent storage period for business reference, the initial storage period expiring at a point defined at least in part by government regulations;

store an email formatted in the multipurpose internet mail extensions format during the initial storage period for regulatory compliance;

upon expiration of the initial storage period at the point defined at least in part by government regulations, strip a hypertext markup language layer from the email formatted in the multipurpose internet mail extensions format while preserving a plain text layer in the email formatted in the multipurpose internet mail extensions format;

store the stripped email formatted in the multipurpose internet mail extensions format during the subsequent storage period for business reference in place of a previous version of the email formatted in the multipurpose internet mail extensions format such that storage space for storing the email is reduced.

* * * * *